F. MOORE.
TESTING DEVICE FOR TRANSMISSION LINE INSULATORS.
APPLICATION FILED MAR. 21, 1919.
1,385,639.
Patented July 26, 1921.
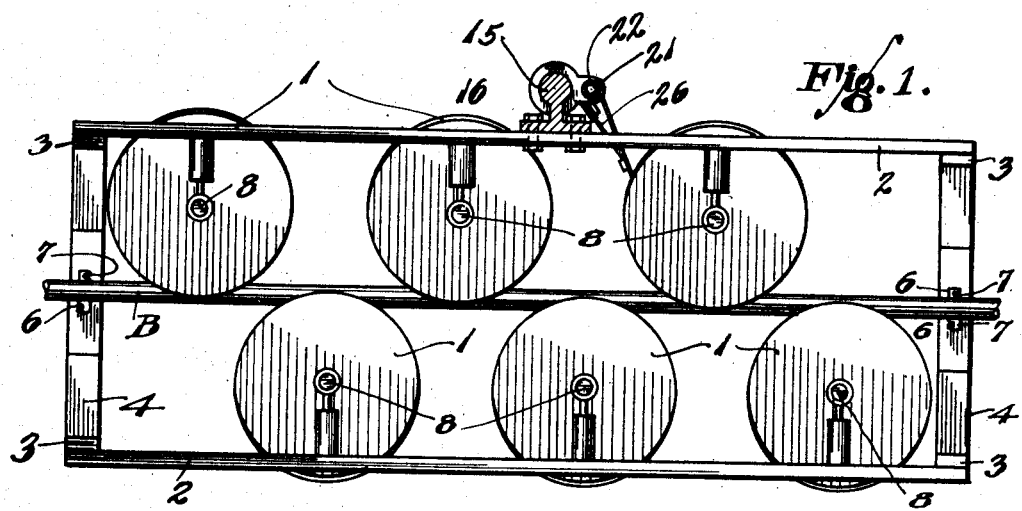
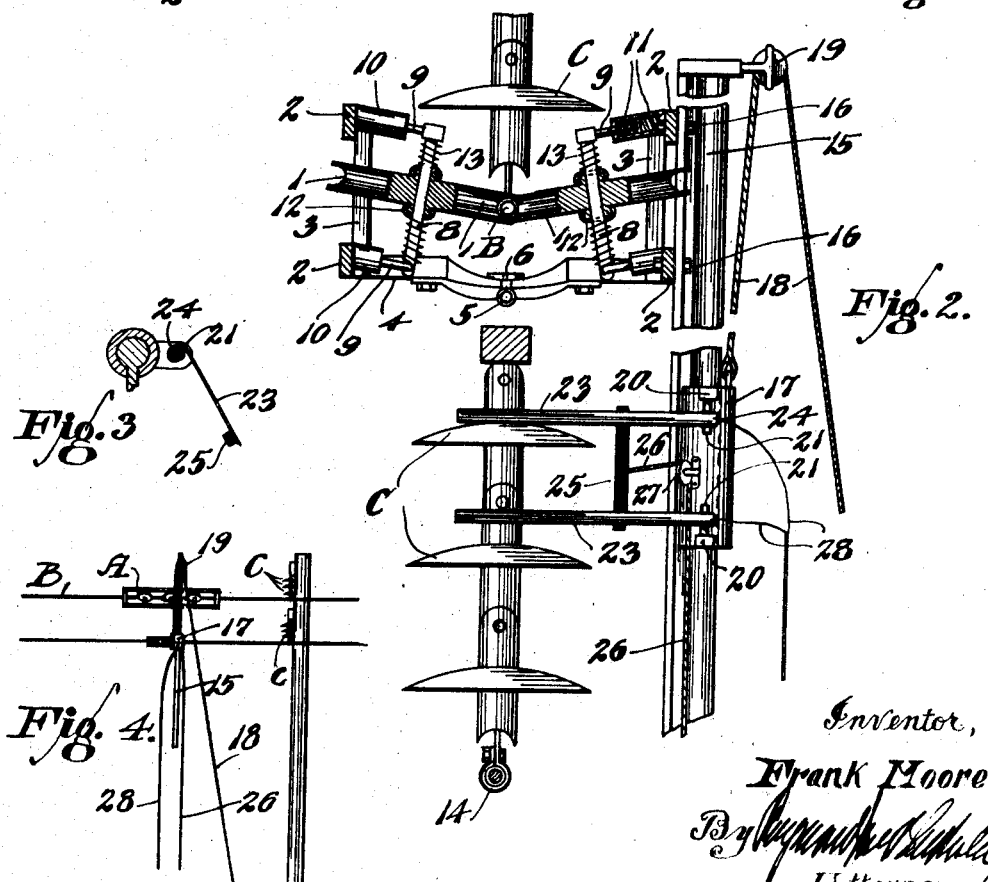
Inventor,
Frank Moore;
By [signature]
Attorney.

UNITED STATES PATENT OFFICE.

FRANK MOORE, OF LOS ANGELES, CALIFORNIA.

TESTING DEVICE FOR TRANSMISSION-LINE INSULATORS.

1,385,639.   Specification of Letters Patent.   Patented July 26, 1921.

Application filed March 21, 1919. Serial No. 284,155.

*To all whom it may concern:*

Be it known that I, FRANK MOORE, a citizen of the United States, residing at Los Angeles, in the county of Los Angeles and State of California, have invented new and useful Improvements in Testing Devices for Transmission-Line Insulators, of which the following is a specification.

This invention relates to testing devices for transmission line insulators, and it has for its object to provide a device whereby any faulty insulation in the support of transmission wires may be detected. Ordinarily, in high tension transmission lines the wires or cables are suspended from the towers or poles and the cross arms or other supports thereon, by means of insulators or insulating devices, and ordinarily these are articulated or comprise a plurality of insulator members or parts, such as the familiar "petticoat" insulator, having the widely flaring insulator hood or arched portion which prevents the establishing of "shorts" in the line. Often leaks are discovered in these insulating devices so that losses take place through them and to the earth. These petticoat devices by their broadly laterally extended form prevent the high tension electrical energy from discharging to the towers or poles and thence to the earth.

In accordance with the invention I provide means for detecting electrical seepage or loss in these insulator devices or between the joints or portions of a "petticoat" or other insulator structure. This detector device is preferably mounted upon one of the plurality of high tension conductors ordinarily strung upon a given series of towers or poles, and it may be moved along so supported until brought into proximity to a given insulator structure where it is properly manipulated by a suitable control extending to the earth, so as to bring the testing device into operative relation with the insulator. An electrical path extends to a suitable testing instrument at the earth, such as an ammeter, so that the attendant may determine what the extent of the leakage or seepage of current is, if any is discovered. Ordinarily it has been necessary for the operator to climb the pole or tower at which the test is to be made and there to apply a testing device directly to the insulator. All of this labor and danger (and the latter is extreme in high tension practice) is obviated in the use of the present invention, and likewise extensive saving of time ensues. By using the invention it has been found that possibly twenty times as many tests may be made in a given day by the use of one such device, as can be made in accordance with the old practice.

With the above and other objects in view, including relative simplicity, inexpensiveness, and facility and convenience in use and service, as well as positiveness and reliability and accuracy in operation and generally increased efficiency, the invention consists in the novel and useful provision, formation, combination, association and relative arrangement of parts, members and features, all as hereinafter described, shown in the drawing, and finally pointed out in claims.

In the drawing:

Figure 1 is a top plan view of a testing device for transmission line insulators which is constructed in accordance with the invention, the upper end of the upright guide member being broken away and shown in section.

Fig. 2 is an end view of the device showing the same in operative position, portions being broken away and shown in section.

Fig. 3 is a detail view showing the spring mounting of one of the testing fingers.

Fig. 4 is a diagrammatic view showing the manner of mounting the device on the line wires of a transmission system.

Corresponding parts in all the figures are designated by the same reference characters.

Specifically describing the embodiment of the invention which is shown by the drawings for illustrative purposes, the reference character A designates a carriage which is adapted to be applied to one of the wires B of a transmission system and to travel along the said wire, said carriage being provided with two opposed sets of grooved guide wheels 1 which engage the line wire to hold the carriage movably in position thereon. The frame of the carriage is formed with parallel side members each of which includes upper and lower longitudinal bars 2 which are connected and held rigidly in proper position by the uprights 3. The two opposed sides of the carriage are connected at the bottom thereof by cross pieces 4, said cross pieces being formed in sections which are joined by hinges 5 so that the two side sections of the carriage can be swung toward and away from each other when applying the carriage to a line wire B or removing it therefrom. A suitable tie member or latch 6 is provided to hold the two sections of the cross pieces 4 rigidly in alinement with each other when the device is in operation, and these latch members are shown as in the form of double hooks which engage lugs 7 on the sections of the cross pieces 4.

The two sets of grooved guide wheels 1 are arranged in planes which diverge upwardly, as indicated by Fig. 2, and this enables the grooved peripheries of the wheels to engage the line wire in such a manner as to properly support the carriage thereon. The guide wheels 1 are each rotatably and slidably mounted upon the intermediate portion of an upright shaft 8, the extremities of each shaft being provided with lateral plungers 9 which are rigid therewith, and which are slidably received within guide housings 10 on the respective sides of the carriage. Spiral springs 11 are arranged within these guide housings 10 and engage the plungers 9 for coöperation therewith to hold the shafts 8 and guide wheels 1 yieldably in operative position. The naves of the grooved wheels 1 have flanged fittings 12 loosely applied thereto, and helical springs 13 which surround the shafts 8 above and below the guide wheels have the extremities thereof secured to the fittings 12 and the ends of the shafts 8, respectively. It will thus be seen that the guide wheels 1 can move up and down upon the shafts 8, but that said movement is arrested by the helical springs 13. If a guide wheel moves upwardly the lower spring 13 is in tension and the upper spring 13 under compression and vice versa, if the movement of the guide wheels is downward. The guide wheels 1 of the two opposed sets have a staggered relation to each other, and the yieldable mounting of the guide wheels enables them to pass readily over the connections 14 by means of which the line wires are secured to the insulators, or to pass over any other obstruction upon the line wire. The carriage is thus mounted upon the line wire so that it can be moved longitudinally thereof for substantially the entire length of the wire. An upright guide member 15 is rigidly secured to one side of the carriage A by suitable fastening members such as the bolts 16, and normally assumes substantially a vertical position when the device is in operation. A slide 17 is mounted upon the upright, being connected to a cable 18 which passes around a pulley 19 at the upper end of the guide member 15. The operator, who may be standing on the ground can elevate the slide 17 by pulling upon the cable 18, or permit the slide to drop by gravity by letting out the cable 18. A pair of lateral lugs 20 project from the slide 17 and are provided with the substantially vertically disposed pins 21 which are suitably insulated as indicated at 22, and which are preferably in alinement with each other. A pair of spaced laterally projecting testing fingers 23 are carried by the pins 21, the inner ends of the testing fingers which have a resilient formation being coiled around the pins as indicated at 24 and then secured thereto. The resiliency of the coiled ends 24 of the testing fingers normally swings the testing fingers outwardly into inoperative position. At an intermediate point in their lengths the testing fingers are connected by a cross piece 25 of insulating material, said cross piece causing the testing fingers to swing in unison, and being connected to a cable 26 which passes around a pulley 27 on the slide 17. The testing fingers normally swing outwardly into inoperative position, although by pulling upon the cable 26 they can be swung inwardly and brought into proper position to engage the caps of a pair of the superposed petticoat insulators C by means of which one of the line wires is supported. To determine whether or not faulty insulation exists, wires 28 extend from the testing fingers 23 to the ground where a suitable indicator such as an ammeter may be connected thereto. If there is leakage at the insulators this will be indicated by the ammeter. The carriage can be moved along the line wire and quickly brought into position adjacent the different sets of insulators. The operator can then raise and lower the slide 17 to bring it into proper position for testing the different insulators, whereupon a pull upon the cable 26 will swing the testing fingers 23 into operative position. This device enables all of the insulators on a transmission line to be quickly and safely tested without the laborious and dangerous work of climbing the poles and manually applying the test wires to the insulators.

Having thus described the invention, what I claim as new is:—

1. A testing device for transmission line insulators, including a carriage constructed to travel along a transmission line, testing fingers carried by the carriage and movable into and out of operative engagement with the insulators, and an indicator connected with the testing fingers whereby current leakage at the insulators may be detected.

2. A testing device for transmission line insulators, including a carriage constructed to travel along a transmission line, testing fingers carried by the carriage and movable into and out of operative engagement with the insulators, means for adjusting the position of the testing fingers on the carriage, and an indicator connected with the testing fingers whereby current leakage at the insulators may be detected.

3. A device for transmission line insulators, including a carriage constructed to travel along a transmission line, laterally swinging testing fingers mounted upon the carriage and movable into and out of operative engagement with the insulators, means for moving the testing fingers up and down upon the carriage, and an indicator connected with the testing fingers whereby current leakage at the insulators may be detected.

4. A testing device for transmission line insulators, including a carriage constructed to travel along a transmission line, testing fingers carried by the carriage and yieldably held in inoperative position, means for moving the testing fingers into operative engagement with the insulators, and an indicator connected with the testing fingers whereby current leakage at the insulators may be detected.

5. A testing device for transmission line insulators, including a carriage constructed to travel along a transmission line, a guide member carried by the carriage, a slide adjustable upon the guide member, testing fingers carried by the slide and movable into and out of operative engagement with the insulators, and an indicator connected with the testing fingers whereby current leakage at the insulators may be detected.

6. A testing device for transmission line insulators, including a carriage constructed to travel along a transmission line, an upright guide member upon the carriage, a slide adjustable up and down upon the guide member, laterally swinging testing fingers carried by the slide and movable into and out of operative engagement with the insulators, and an indicator connected with the testing fingers whereby current leakage at the insulators may be detected.

7. A testing device for a transmission line insulator device including a carriage constructed to travel along a transmission line, testing fingers carried by the carriage and movable into and out of operative engagement with the insulators, a means operable from the ground for adjusting the position of the test fingers on the carriage, means also operable from the ground for moving the testing fingers into operative position, and an indicator connected with the testing fingers whereby current leakage at the insulators may be detected.

8. A testing device for transmission line insulators, including a carriage constructed to travel along a transmission line, testing fingers carried by the carriage and movable into and out of operative engagement with the insulators, means operable from the ground for controlling the movements of the testing fingers, and an indicator connected with the testing fingers whereby current leakage at the insulators may be detected.

9. A testing device for transmission line insulators, including a carriage provided with opposed sets of yieldably mounted guide wheels arranged to engage a transmission line wire to admit of the carriage moving thereon, testing fingers carried by the carriage and movable into and out of operative engagement with the insulators, and an indicator connected with the testing fingers whereby current leakage at the insulators may be detected.

10. A testing device for transmission line insulators, including a carriage formed with relatively movable side sections, opposed sets of guide wheels carried by the side sections of the carriage and adapted to be brought into engagement with a transmission line wire to movably support the carriage thereon, testing members carried by the carriage, means for bringing the testing members into engagement with the insulators, and an indicator connected with the testing fingers whereby current leakage at the insulators may be detected.

In testimony whereof, I have signed my name to this specification in the presence of two subscribing witnesses.

FRANK MOORE.

Witnesses:
  J. L. D. MOORE,
  LESLIE PYLE.